United States Patent
Lee et al.

(10) Patent No.: US 6,832,889 B1
(45) Date of Patent: Dec. 21, 2004

(54) INTEGRATED BRIDGE TURBINE BLADE

(75) Inventors: Ching-Pang Lee, Cincinnati, OH (US); Richard Clay Haubert, Hamilton, OH (US); Harvey Michael Maclin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 10/616,023

(22) Filed: Jul. 9, 2003

(51) Int. Cl.$^7$ .............................................. F03D 11/00
(52) U.S. Cl. ..................... 415/115; 416/97 R; 416/97 A
(58) Field of Search .................................. 415/115, 116; 416/95, 96 R, 97 A, 97 R

(56) References Cited

U.S. PATENT DOCUMENTS

| | | | |
|---|---|---|---|
| 5,156,526 A | 10/1992 | Lee et al. | |
| 5,165,852 A | 11/1992 | Lee et al. | |
| 5,356,265 A | * 10/1994 | Kercher | ..................... 416/97 R |
| 5,387,085 A | 2/1995 | Thomas et al. | |
| 5,591,007 A | 1/1997 | Lee et al. | |
| 5,660,524 A | 8/1997 | Lee et al. | |
| 5,690,472 A | 11/1997 | Lee | |
| 5,813,835 A | 9/1998 | Corsmeier et al. | |
| 5,967,752 A | 10/1999 | Lee et al. | |
| 6,168,381 B1 | * 1/2001 | Reddy | ...................... 416/97 R |
| 6,183,198 B1 | * 2/2001 | Manning et al. | ........... 416/97 R |
| 6,254,334 B1 | 7/2001 | Lafleur | |
| 6,402,470 B1 | 6/2002 | Kvasnak et al. | |
| 6,514,042 B2 | 2/2003 | Kvasnak et al. | |

* cited by examiner

*Primary Examiner*—Edward K. Look
*Assistant Examiner*—Dwayne White
(74) *Attorney, Agent, or Firm*—William S. Andes; Francis L. Conte

(57) ABSTRACT

A turbine blade includes a hollow airfoil integrally joined to a dovetail. The airfoil includes a perforate first bridge defining a flow channel behind the airfoil leading edge. A second bridge is spaced behind the first bridge and extends from a pressure sidewall of the airfoil short of the airfoil trailing edge. A third bridge has opposite ends joined to the pressure sidewall and the second bridge to define with the first bridge a supply channel for the leading edge channel, and defines with the second bridge a louver channel extending aft along the second bridge to its distal end at the pressure sidewall.

21 Claims, 3 Drawing Sheets

INTEGRATED BRIDGE TURBINE BLADE

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to turbine blade cooling therein.

In a gas turbine engine, air is pressurized in a multistage compressor and mixed with fuel for generating hot combustion gases in a combustor. The gases are discharged through a high pressure turbine (HPT) which powers the compressor, typically followed by a low pressure turbine (LPT) which provides output power by typically powering a fan at the upstream end of the engine. This turbofan configuration is used for powering commercial or military aircraft.

Engine performance or efficiency may be increased by increasing the maximum allowed operating temperature of the combustion gases that are discharged to the HPT which extracts energy therefrom. Furthermore, engines are continually being developed for increasing cruise duration and distance, for one exemplary commercial application for a supersonic business jet and for an exemplary military application such as a long range strike aircraft.

Increasing turbine inlet temperature and cruise duration correspondingly increases the cooling requirements for the hot engine components, such as the high pressure turbine rotor blades. The first stage rotor blades receive the hottest combustion gases from the combustor and are presently manufactured with state-of-the-art superalloy materials having enhanced strength and durability at elevated temperature. These blades may be configured from a myriad of different cooling features for differently cooling the various portions of the blades against the corresponding differences in heat loads thereto during operation.

The presently known cooling configurations for first stage turbine blades presently limit the maximum allowed turbine inlet temperature for obtaining a suitable useful life of the blades. Correspondingly, the superalloy blades are typically manufactured as directionally solidified materials or monocrystal materials for maximizing the strength and life capability thereof under the hostile hot temperature environment in the gas turbine engine.

The intricate cooling configurations found in the blades are typically manufactured using common casting techniques in which one or more ceramic cores are utilized. The complexity of the cooling circuits in the rotor blades are limited by the ability of conventional casting processes in order to achieve suitable yield in blade casting for maintaining competitive costs.

Accordingly, it is desired to provide an improved turbine rotor blade cooling configuration for further advancing temperature and duration capability thereof in a gas turbine engine.

BRIEF DESCRIPTION OF THE INVENTION

A turbine blade includes a hollow airfoil integrally joined to a dovetail. The airfoil includes a perforate first bridge defining a flow channel behind the airfoil leading edge. A second bridge is spaced behind the first bridge and extends from a pressure sidewall of the airfoil short of the airfoil trailing edge. A third bridge has opposite ends joined to the pressure sidewall and the second bridge to define with the first bridge a supply channel for the leading edge channel, and defines with the second bridge a louver channel extending aft along the second bridge to its distal end at the pressure sidewall.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
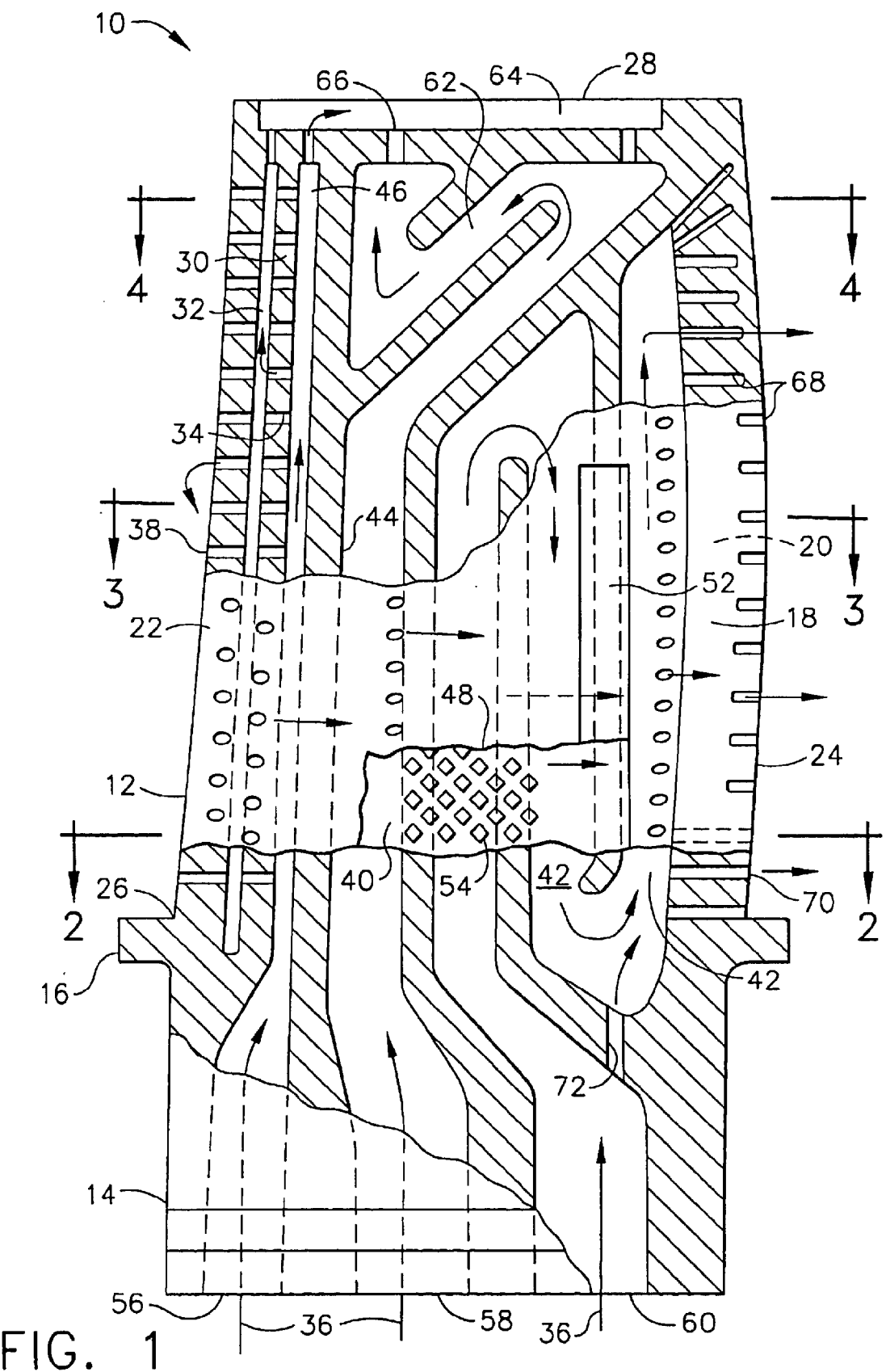
FIG. 1 is an axial sectional view in elevation of an exemplary high pressure turbine rotor blade having multiple bridges and cooling channels therein.

Illustrated in FIG. 1 is an exemplary first stage turbine rotor blade 10 for use in a gas turbine engine in a high pressure turbine immediately downstream from a combustor thereof. The blade may be used in an aircraft gas turbine engine configuration, or may also be used in non-aircraft derivatives thereof.

The blade includes a hollow airfoil 12 extending radially in span outwardly from a supporting dovetail 14 joined together at a common platform 16. The dovetail may have any conventional configuration including dovetail lobes or tangs which mount the blade into a corresponding dovetail slot in the perimeter of a turbine rotor disk (not shown). The dovetail is joined to the integral platform by a shank therebetween.

The airfoil 12 includes a concave pressure sidewall 18 and a laterally or circumferentially opposite convex sidewall 20. The two sidewalls are joined together at axially or chordally opposite leading and trailing edges 22,24, and are spaced apart therebetween. The airfoil sidewalls and edges extend radially in span from an inner root 26 to an outer tip 28. The dovetail is integrally joined to the airfoil at the platform disposed at the airfoil root which defines the radially inner boundary for the combustion gases which flow around the airfoil during operation.

Figure 2:
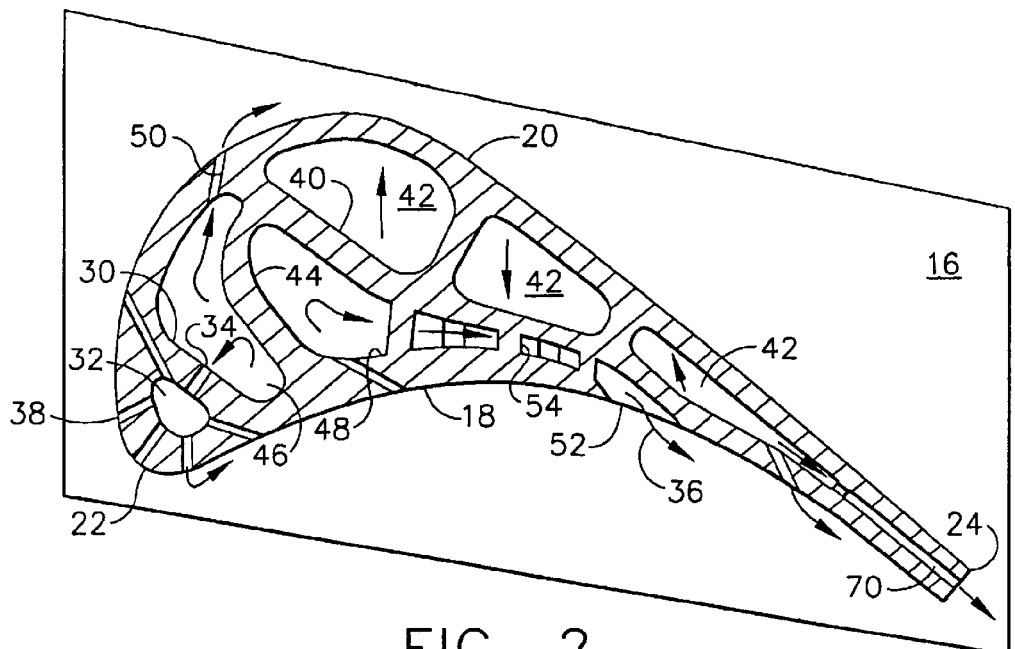
FIG. 2 is a radial sectional view of the blade airfoil of FIG. 1 near its root and taken along line 2—2.
Figure 3:
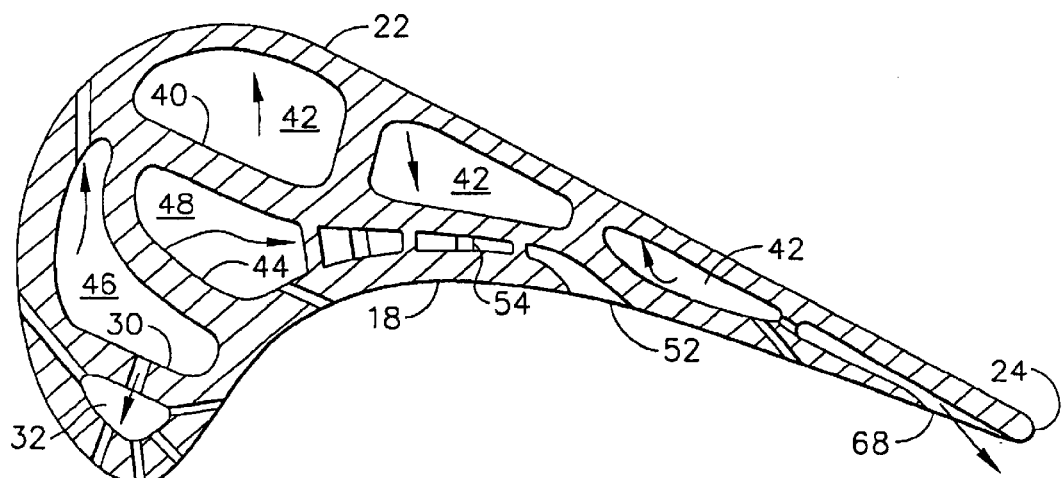
FIG. 3 is a radial sectional view of the blade airfoil illustrated in FIG. 1 near the pitch or mid-span thereof and taken along line 3—3.
Figure 4:
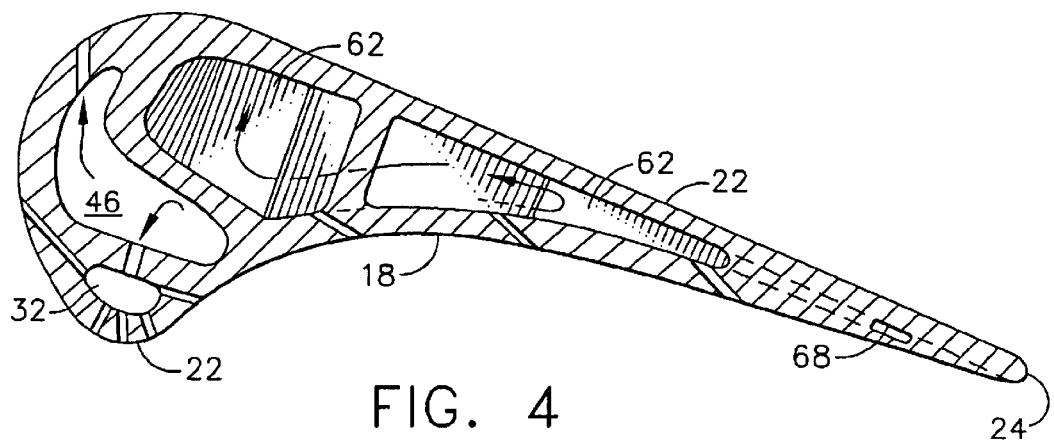
FIG. 4 is a radial sectional view of the blade airfoil illustrated in FIG. 1 near the blade tip and taken along line 4—4.

FIGS. 2–4 illustrate three radial sectional views of the airfoil shown in FIG. 1 near the airfoil root, at the mid-span or pitch section, and near the airfoil tip, respectively. As shown in FIGS. 1 and 2, for example, the airfoil further includes a perforate first cold bridge 30 spaced behind or aft from the leading edge 22, and having opposite lateral ends integrally joined to the pressure and suction sidewalls 18,20 to define a leading edge flow channel 32 extending in radial span behind the leading edge and laterally bound by the surrounding portions of the sidewalls and the first bridge.

The first bridge includes a row of impingement apertures 34 through which is channeled pressurized air 36 bled from a compressor (not shown) of the engine for providing blade cooling. The air firstly impinges the inside or backside of the airfoil leading edge for cooling thereof, with the spent impingement air then being discharged from the leading edge channel 32 through several rows of showerhead holes and gill holes 38 radiating outwardly therefrom along the two sidewalls in a conventional configuration.

The airfoil further includes an imperforate second cold bridge 40 extending in radial span behind the first bridge 30 and spaced aft therefrom. The second bridge 40 extends integrally from the suction sidewall 20 and chordally aft to integrally join the pressure sidewall 18 before or short of the trailing edge 24 to define a first serpentine flow channel 42 laterally between the second bridge and the suction sidewall.

An imperforate third cold bridge 44 extends in radial span between the first and second bridges 30,40 and is integrally joined at opposite lateral ends to the pressure sidewall and the second bridge 40. The third bridge 44 defines with the first bridge 30 a supply flow channel 46 extending in radial span for channeling the pressurized air 36 through the impingement apertures of the first bridge for impingement cooling the backside of the airfoil leading edge. The third bridge 44 also defines with the second bridge 40 a gill or louver flow channel 48 extending axially aft along the second bridge to the distal end thereof at the pressure sidewall 18.

In this way, the three cold bridges 30,40,44 define corresponding flow channels integrated in a new configuration for providing enhanced cooling of the airfoil during operation. The various cooling channels of the airfoil illustrated in the Figures will include various forms of turbutators (not shown) extending along the inner surfaces thereof as required for tripping the cooling airflow for enhancing heat transfer in a conventional manner. However, the integrated three-bridge configuration enhances cooling effectiveness of the limited cooling air.

As illustrated in FIG. 2, the suction sidewall 20 includes a row of film cooling apertures 50 disposed in flow communication with the supply channel 46 adjacent the second bridge 40. The third bridge 44 is preferably arcuate, or bowed convex, in the radial plane illustrated, inside the supply channel 46 which is correspondingly bowed concave arcuate in a general C-shape to guide the cooling air 36 laterally for discharge through the film cooling apertures 50. This unique configuration of the supply channel 46 guides the flow being channeled through the supply channel 46 closer to the suction sidewall 20 for enhanced cooling thereof, while air is also discharged through the impingement apertures 34 for impingement cooling the backside of the leading edge.

On the opposite, pressure sidewall 18, the airfoil includes a radial elongate outlet slot adjacent the distal end of the second bridge 40 and disposed in flow communication with the discharge end of the louver channel 48 for discharging a radially continuous film of cooling air therefrom. A particular advantage of the louver channel 48 is the isolation of the cold second bridge 40 from the adjacent portion of the pressure sidewall 18, with backside cooling of the pressure sidewall being effected by the axial flow of the cooling air 36 through the louver channel for discharge from the slot 52 thereof.

The axially forward portion of the louver channel extends open in radial span for feeding the cooling air to a mesh pattern of pins 54 spaced apart from each other and integrally joined at opposite lateral ends to the second bridge 40 and to the pressure sidewall 18 forward of the outlet slot 52. The mesh pins 54 may have any suitable configuration, such as round or square for example, and provide a locally tortuous or serpentine cooling path between the cold second bridge 40 and the hot pressure sidewall. In this way, the cooling air may be channeled axially between the mesh pins 54 for collective discharge from the common radial slot 52 to provide continuous radial film cooling along the aft portion of the pressure sidewall for protecting the thin trailing edge portion of the airfoil.

As illustrated in FIG. 1, the supply channel 46 includes a first inlet 56 extending through the dovetail 14 to the blade root. The louver channel 48 includes a second inlet 58 extending through the dovetail behind the first inlet 56 and feeds the open forward end of the louver channel with the cooling air 36. And, the first serpentine flow channel 42 includes a third inlet 60 extending through the dovetail behind the second inlet. The three dovetail inlets provide independent portions of the cooling air to the corresponding cooling circuits fed thereby.

As collectively illustrated in FIGS. 1–4, the airfoil preferably also includes a slant tier second serpentine channel 62 disposed outward or above the louver channel 48 in flow communication with the radially open forward portion thereof which receives air from the second inlet 58. The second serpentine channel is formed by corresponding slanted bridges disposed obliquely from the radial or span axis of the airfoil.

In order to provide room for the second serpentine channel 62 with its slant bridges, it is disposed in aft part over or above the first serpentine channel 42 which suitably terminates in radial span below the airfoil tip 28. FIG. 4 is a radial cross section of the airfoil through the second serpentine channel 62 with portions of the slant bridges hiding from view the first serpentine flow channel located therebelow.

A particular advantage of integrating the slanted second serpentine channel 62 near the blade tip is the additional effectiveness thereof for the tip region of the airfoil. More specifically, the first serpentine channel illustrated in FIG. 1 preferably consists of three flow reversing legs, and two corresponding radial dividing bridges therebetween. And, the second serpentine channel 62 preferably consists of three flow reversing legs and two corresponding slanted or inclined dividing bridges therebetween.

In this way, local serpentine cooling from the midchord to the trailing edge region of the airfoil is provided from the root radially outwardly, and terminates in transition from above the mid-span of the airfoil at the midchord region thereof to the tip of the airfoil near the trailing edge. The slant tier second serpentine channel 62 correspondingly provides serpentine cooling thereabove and below the airfoil tip to complement the first serpentine cooling circuit.

As shown in FIG. 1, the airfoil further includes a recessed or hollow tip cap 64 defined by a recessed floor in surrounding extensions of the pressure and suction sidewalls which define thin squealer tips or ribs. The tip cap 64 has a plurality of floor apertures 66 disposed radially therethrough in flow communication with the leading edge channel 32, the supply channel 46, and the louver channel 48, through the common second serpentine channel 62.

In this way, additional outlets are provided for the these cooling circuits in addition to conventional film cooling apertures which may also be used therewith through the pressure and suction sidewalls of the airfoil. Spent cooling air is discharged from the several channels for feeding the tip cap 64 in an otherwise conventional manner for enhanced cooling thereof.

Cooling of the trailing edge region of the airfoil illustrated in FIG. 1 is preferably provided by two forms of discharge holes therein. A row of outer trailing edge slots 68 is disposed in flow communication with the last leg of the first serpentine flow channel 42. The trailing edge slots 68 are inclined through the pressure sidewall 18 and terminate on the pressure sidewall short of or just before the actual trailing edge 24 itself. This permits the trailing edge 24 to be extremely thin for increasing aerodynamic efficiency of the airfoil in a conventional manner.

However, whereas the outer trailing edge slots 68 are preferably disposed over a majority of the trailing edge from just above the airfoil root to just below the airfoil tip, a short row of inner trailing edge apertures 70 is disposed in flow communication with the lower portion of the last leg of the first serpentine channel 42. The three exemplary inner trailing edge apertures 70 illustrated in FIG. 1 extend chordally between the pressure and suction sidewalls 18,20, as illustrated in FIG. 2, to terminate through the trailing edge 24 itself generally parallel between the two opposite sidewalls of the airfoil.

The trailing edge 24 near the blade root is suitably thicker for accommodating the trailing edge apertures 70 extending therethrough, and correspondingly increases the strength of the airfoil at its junction with the platform 16. However, above the trailing edge apertures 70, the airfoil may be made thinner and transition to the use of the pressure-side trailing edge cooling slots 68.

Since the air provided to the trailing edge outlets is obtained from the last leg of the three-leg serpentine channel 42, the air has been heated during the initial legs of the serpentine. Accordingly, it may be desired to include a refresher hole 72 as illustrated in FIG. 1 in the forward leg of the first serpentine channel 42 to directly bypass a portion of air from the third inlet 60 directly to the last leg of the first serpentine channel. In this way, relatively cool air may be directly provided to the last leg of the serpentine channel for mixing with the spent serpentine air therein for enhancing cooling performance of the trailing edge as desired.

In FIG. 1, the slant tier serpentine channel 62 is located directly under the tip cap 64. In an alternate configuration illustrated in FIG. 5, the airfoil may additionally include an axial outer bridge 74 spaced radially inwardly from the tip cap and extending generally parallel thereto, and aft to the trailing edge 24. The outer bridge 74 defines a tip channel 76 disposed in flow communication with the second serpentine channel 62 for discharging air therefrom through a corresponding discharge aperture defined at the aft end of the tip channel, preferably terminating in the airfoil pressure side short of the trailing edge in the same manner as the trailing edge slots 68.

In this way, the airfoil tip is additionally cooled by the introduction of the axial tip channel 76 which provides dedicated backside cooling of the tip floor from the spent air discharged from the second serpentine channel.

The integration of the three cold bridges 30,40,44 correspondingly integrates the cooling circuits 32,42,46,48 for providing double-wall cooling with enhanced effectiveness. The configuration of these cold bridges also permits conventional casting of the airfoil using corresponding ceramic cores for the flow channels or cavities. The leading edge channel and the corresponding trailing edge channel can be formed in a one-piece core or in two separate simple cores. The middle flow channels or circuits therebetween may be formed in an independent core. These two or three cores may then be assembled together for conventional lost-wax casting.

The integrated cold bridge configuration described above will result in a reasonable casting yield for limiting manufacturing costs. The second cold bridge 40 is centrally located in the airfoil generally along the camber line thereof and provides a strong central support having a lower bulk temperature during operation. The leading edge utilizes the cold first bridge 30 in a conventional configuration with corresponding performance benefits thereof.

The third cold bridge 44 integrates the cooling circuits defined by the first and second cold bridges 30,40 and has the preferred convex profile for enhancing cooling of the suction sidewall. Correspondingly, the mesh pins 54 of the louver channel 48 provide locally enhanced cooling of the opposite pressure sidewall against the relatively high heat load experienced thereby during operation.

The bank or array of pins 54 create high turbulence in the cooling air being discharged therearound due to interaction of the intersecting air jets therein. And, the pins themselves conduct heat from the hot pressure sidewall to the relatively cold second bridge 40 forming a highly efficient heat exchanger. The common exit slot 52 for the mesh pins of the louver channel provides full radial coverage of the film cooling air within the limit of its span, and a correspondingly higher cooling film effectiveness downstream therefrom toward the trailing edge.

The inclined three-pass serpentine channel 62 introduces strong turbulence of the cooling air flowing therethrough at the multiple turns therein, and produces effective cooling of the airfoil outer span to prevent overheating thereof from radial migration of the hot combustion gases outside the airfoil.

The trailing edge preferably includes the dual cooling arrangement provided by the two types of trailing edge outlets 68,70 for maintaining strength of the trailing edge near the root with the center apertures 70 splitting the trailing edge itself, while thereabove the pressure-side outlet slots 68 maintain aerodynamic advantage over the majority of the trailing edge.

Figure 5:
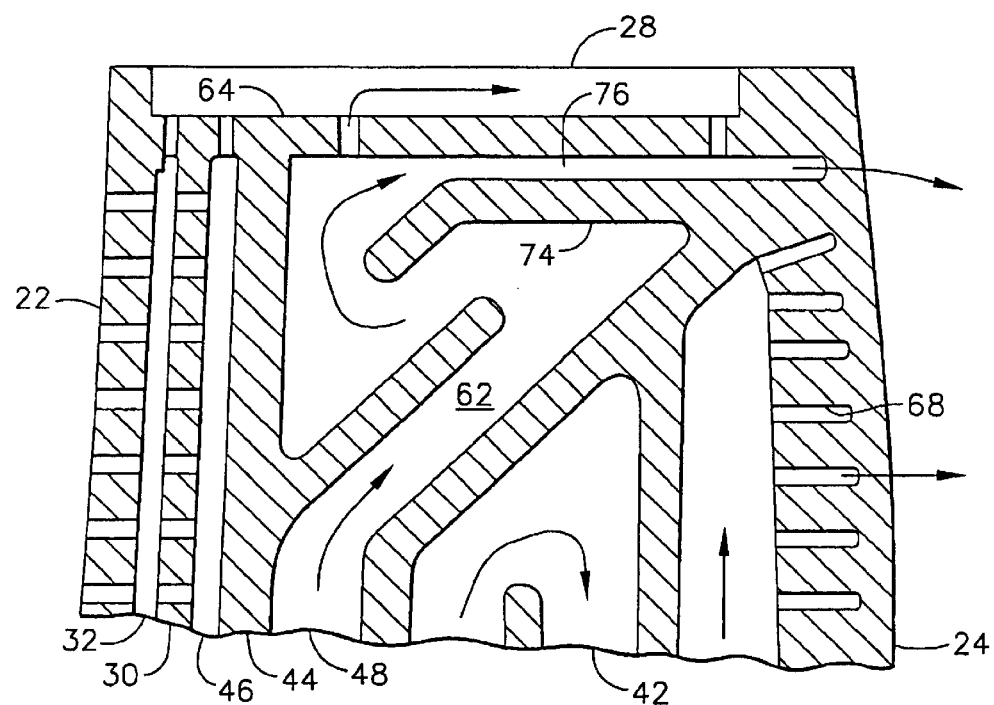
FIG. 5 is a elevational sectional view of the radially outer tip region of the airfoil illustrated in FIG. 1 in accordance with alternate embodiment.

A particular advantage of the inclined or slanted bridges of the second serpentine channel 62 illustrated in the two embodiments of FIGS. 1 and 5 is the additional structural stiffness provided thereby for reducing or preventing stripe modes of sidewall panel vibration, and higher order complex panel vibratory modes. And, in the FIG. 5 embodiment, the introduction of the additional horizontal outer bridge 74 further increases the stiffness of the airfoil tip region for reducing these modes of vibratory response.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   a hollow airfoil including a concave pressure sidewall and laterally opposite convex suction sidewall joined together at chordally opposite leading and trailing edges extending in span from a root to a tip;
   a dovetail integrally joined to said airfoil at said root;
   said airfoil further including a perforate first bridge spaced behind said leading edge and integrally joined to said pressure and suction sidewalls to define a leading edge channel therebetween;
   said airfoil further including an imperforate second cold bridge spaced behind said first bridge, and extending integrally from said suction sidewall chordally aft to integrally join said pressure sidewall before said trailing edge to define a first serpentine flow channel adjacent said suction sidewall; and
   said airfoil further including an imperforate third bridge disposed between said first and second bridges, and integrally joined at opposite ends to said pressure sidewall and said second bridge in a convex profile to define with said first bridge a complementary concave supply channel for channeling air through said first bridge, and to define with said second bridge a louver channel extending axially aft therealong to a distal end thereof at said pressure sidewall.

2. A blade according to claim 1 wherein said pressure sidewall includes an elongate outlet slot adjacent said distal end of said second bridge disposed in flow communication with said louver channel.

3. A blade according to claim 2 wherein:
said supply channel includes a first inlet extending through said dovetail;
said louver channel includes a second inlet extending through said dovetail behind said first inlet; and
said first serpentine flow channel includes a third inlet extending through said dovetail behind said second inlet.

4. A blade according to claim 3 further comprising a recessed tip cap having a plurality of floor apertures therethrough disposed in flow communication with said leading edge channel, said supply channel, and said louver channel.

5. A blade according to claim 4 wherein:
said suction sidewall includes a row of film cooling apertures disposed in flow communication with said supply channel adjacent said second bridge 40; and
said third bridge is convex inside said supply channel to guide said air to said film cooling apertures.

6. A blade according to claim 5 wherein said louver channel includes a mesh pattern of pins spaced apart from each other and integrally joined at opposite ends to said second bridge and said pressure sidewall forward of said outlet slot for providing locally serpentine mesh cooling of said pressure sidewall.

7. A blade according to claim 6 further comprising a slant tier second serpentine flow channel disposed above said louver channel in flow communication therewith.

8. A blade according to claim 7 wherein said second serpentine channel is disposed in aft part over said first serpentine channel.

9. A blade according to claim 7 wherein:
said first serpentine channel consists of three flow reversing legs, and said second serpentine channel consists of three flow reversing legs; and
said first serpentine channel includes a refresher hole in a last leg thereof disposed in flow communication with said third inlet.

10. A blade according to claim 7 further comprising:
an outer bridge spaced inwardly from said tip cap to define a tip channel disposed in flow communication with said second serpentine channel for discharging air therefrom through a corresponding discharge aperture at said trailing edge;
a row of outer trailing edge slots disposed in flow communication with said first serpentine channel, and terminating on said airfoil pressure sidewall before said trailing edge; and
a row of inner trailing edge apertures disposed in flow communication with said first serpentine channel, and extending chordally between said pressure and suction sidewalls to terminate through said trailing edge.

11. A turbine blade comprising:
a hollow airfoil including a concave pressure sidewall and laterally opposite convex suction sidewall joined together at chordally opposite leading and trailing edges extending in span from a root to a tip;
a dovetail integrally joined to said airfoil at said root;
said airfoil further including a perforate first bridge spaced behind said leading edge and integrally joined to said pressure and suction sidewalls to define a leading edge channel therebetween;
said airfoil further including a second cold bridge spaced behind said first bridge, and extending integrally from said suction sidewall chordally aft to integrally join said pressure sidewall before said trailing edge to define a first serpentine flow channel adjacent said suction sidewall; and
said airfoil further including a third bridge disposed between said first and second bridges, and integrally joined at opposite ends to said pressure sidewall and said second bridge to define with said first bridge a supply channel for channeling air through said first bridge, and to define with said second bridge a louver channel extending axially aft therealong to a distal end thereof at said pressure sidewall.

12. A blade according to claim 11 wherein:
said suction sidewall includes a row of film cooling apertures disposed in flow communication with said supply channel adjacent said second bridge; and
said third bridge is convex inside said supply channel to guide said air to said film cooling apertures.

13. A blade according to claim 12 wherein said pressure sidewall includes an elongate outlet slot adjacent said distal end of said second bridge disposed in flow communication with said louver channel.

14. A blade according to claim 13 wherein said louver channel includes a mesh pattern of pins spaced apart from each other and integrally joined at opposite ends to said second bridge and said pressure sidewall forward of said outlet slot for providing locally serpentine mesh cooling of said pressure sidewall.

15. A blade according to claim 14 wherein:
said supply channel includes a first inlet extending through said dovetail;
said louver channel includes a second inlet extending through said dovetail behind said first inlet; and
said first serpentine flow channel includes a third inlet extending through said dovetail behind said second inlet.

16. A blade according to claim 14 further comprising a slant tier second serpentine flow channel disposed above said louver channel in flow communication therewith.

17. A blade according to claim 16 wherein said second serpentine channel is disposed in aft part over said first serpentine channel.

18. A blade according to claim 17 wherein said first serpentine channel consists of three flow reversing legs, and said second serpentine channel consists of three flow reversing legs.

19. A blade according to claim 17 further comprising a recessed tip cap having a plurality of floor apertures therethrough disposed in flow communication with said leading edge channel, said supply channel, and said louver channel.

20. A blade according to claim 19 further comprising an outer bridge spaced inwardly from said tip cap to define a tip channel disposed in flow communication with said second serpentine channel for discharging air therefrom through a corresponding discharge aperture at said trailing edge.

21. A blade according to claim 14 further comprising:
a row of outer trailing edge slots disposed in flow communication with said first serpentine channel, and terminating on said airfoil pressure sidewall before said trailing edge; and
a row of inner trailing edge apertures disposed in flow communication with said first serpentine channel, and extending chordally between said pressure and suction sidewalls to terminate through said trailing edge.

* * * * *